3,721,685
NOVEL 19-NOR $\Delta^{4,9}$-PREGNADIENES
Jean Jolly, Fontenay-sous-Bois, and André Pierdet, Noisy-le-Sec, France, assignors to Roussel-UCLAF, Paris, France
No Drawing. Filed Mar. 1, 1971, Ser. No. 119,891
Claims priority, application France, Mar. 3, 1970, 7007550
Int. Cl. C07c 169/34
U.S. Cl. 260—397.4        9 Claims

ABSTRACT OF THE DISCLOSURE

13β-R-17α-methyl-18,19-dinor-$\Delta^{4,9}$-pregnadienes of the formula

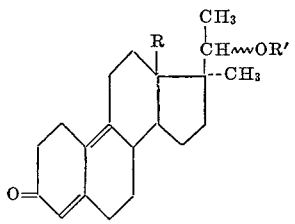

wherein R is alkyl of 1 to 4 carbon atoms and R' is selected from the group consisting of hydrogen and acyl of an organic carboxylic acid of 1 to 18 carbon atoms having anti-ovulatory activity and their preparation and intermediates thereof.

OBJECTS OF THE INVENTION

It is an object of the invention to provide the novel 13β-R-18,19-dinor-$\Delta^{4,9}$-pregnadienes of Formula I.

It is a further object of the invention to provide a novel process for the preparation of the compounds of Formula I and intermediates therefor.

It is another object of the invention to provide novel anti-ovulation compositions.

It is an additional object of the invention to provide a novel method of preventing ovulation in warm-blooded animals.

These and other objects and advantages of the invention will become obvious from the following detailed description.

The novel 13β-R-18,19-dinor-$\Delta^{4,9}$-pregnadiene-3-ones of the invention have the formula

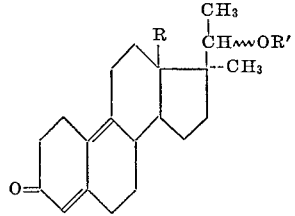

wherein R is alkyl of 1 to 4 carbon atoms and R' is selected from the group consisting of hydrogen and acyl of an organic carboxylic acid of 1 to 18 carbon atoms.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid myristic acid, palmitic acid and stearic acid; alkenoic acids such as undecylenic acid and oleic acid, cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, ylopentyl propionic acid and cyclohexyl propionic acid; arylalkanoic acids, such as phenyl acetic acid and phenyl propionic acid; aryl carboxylic acids, such as benzoic acid; phenoxy alkanoic acids, such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5- ter-butylfurane-2-carboxylic acid, 5-bromofurane-2-carboxylic acid and nicotinic acids; β-ketoalkanoic acids, such as acetylacetic acid, propionylacetic acid and butyryl-acetic acid; amino acids, such as diethylaminoacetic acid and asparatic acid.

Among the preferred compounds of the invention are 17α-methyl-19-nor-$\Delta^{4,9}$-pregnadiene - 20α - ol-3-one, 17α-methyl-19-nor - $\Delta^{4,9}$-pregnadiene-20β-ol-3-one, 13β-ethyl-17α-methyl-18,19-dinor-$\Delta^{4,9}$-pregnadiene - 20α - ol-3-one and 13β - ethyl-17α-methyl-18,19-dinor-$\Delta^{4,9}$-pregnadiene-20β-ol-3-one.

The novel process of the invention for the preparation of the compounds of Formula I comprises reacting 3-methoxy-13β-R-17α-acetyl - 17β - acetoxy-$\Delta^{1,3,5(10)}$-gonatriene with lithium in liquid ammonia and then with a methylating agent to obtain 3-methoxy-13β-R-17α-methyl-17β-acetyl-$\Delta^{1,3,5(10)}$-gonatriene, subjecting the latter to the Birch reaction by reaction with lithium in liquid ammonia in the presence of ethanol to obtain 3-methoxy-13β-R-17α-methyl - 18,19 - dinor - $\Delta^{2,5(10)}$ - pregnadiene-20ξ-ol, subjecting the latter to the action of a weak acid in an aqueous media to form 13β-R-17α-methyl-18,19-dinor-$\Delta^{5(10)}$-pregnene-20ξ-ol - 3 - one, reacting the latter with a bromination agent selected from the group consisting of bromine and pyridinium perbromide in the presence of a dehydrobromination agent to form the corresponding 13β-R-17α-methyl-18,19-dinor - $\Delta^{4,9}$ - pregnadiene-20ξ-ol-3-one which if desired can be reacted with an esterification agent to form the corresponding ester.

The methylation agent is preferably a methyl halide such as methyl iodide. The 20ξ-ol derivative which results from the Birch reaction is a mixture of 20α-ol and 20β-ol derivatives of 3-methoxy-13β-R-17α-methyl-18,19-dinor-$\Delta^{2,5(10)}$-pregnadiene-20ξ-ol. The mixture of 13β-R-17α-methyl-18,19-dinor-$\Delta^{5(10)}$-pregnene-20ξ-ol-3-one resulting from the acid treatment can be separated into the 20α and 20β-isomers by chromatography.

The bromination and dehydrobromination may be effected upon the individual 20α-ol or 20β-ol isomers or on the mixture thereof which results in the corresponding 20α-ol or 20β-ol isomers or mixtures thereof. The said reaction can be effected with bromine in a methanol solution in the presence of excess of pyridine or with pyridinium perbromide in the presence of a large excess of pyridine. The reaction mixture containing 13β-R-17α-methyl-18,19-dinor-$\Delta^{4,9}$-pregnadiene-20α-ol-3-one and 13β-R-17α-methyl-18,19-dinor-$\Delta^{4,9}$-pregnadiene-20β-ol-3-one can be separated into its individual components by chromatography.

The esters, of the compounds of Formula I can be prepared by reacting the free 20ξ-ol compound with the appropriate organic carboxylic acid in the presence of a strong acid catalyst. The esters can equally be prepared by reaction with a functional derivative of the acid such as the acid halide, acid anhydride or mixed anhydride or a metallic salt of the acid.

The 3-methoxy-13β-R-17α-acetyl-17β-acetoxy-$\Delta^{1,3,5(10)}$-gonatrienes used as the starting materials can be prepared by the process of published Netherland application No. 6607588 and the 13β-R-17α-methyl-18,19-dinor-$\Delta^{5(10)}$- pregnene-20ξ-ol-3-ones prepared as intermediates in the process of the invention can be prepared by the process of French BSM No. 5064M.

The novel anti-ovulation compositions of the invention are comprised of an effective amount of at least one compound of Formula I and a pharmaceutical carrier. The compositions may be in the form of injectable solutions or suspensions in ampoules or multiple dose flacons or in the form of tablets, coated tablets, gelules, capsules, powders, aromatized emulsions or suppositories. The usual individual dose is 0.25 to 100 mg.

The compositions of the invention posses more marked anti-ovulatory activity than the corresponding 20-one compounds while possessing progestomimetic and hypophysical inhibiting (anti-LH) activities of the same order and are therefore useful in the contraceptive field for humans and animals.

The novel method of the invention for preventing ovulation in warm-blooded animals comprises administering to warm-blooded animals an effective amount of a compound of Formula I. The compounds may be administered orally, rectally or parenterally. The usual daily dose is 0.008 to 1.6 mg./kg. depending upon the method of administration.

In the following examples there are described several preferred embodiments to illustrate the invention. However, it should be understood that the invention is not intended to be limited to the specific embodiments.

EXAMPLE I

Preparation of 13β-ethyl-17α-methyl-18,19-dinor-$\Delta^{4,9}$-pregnadiene-20α- and 20β-ol-3-one Step A: 3 - methoxy - 13β-ethyl-17α-methyl-17β-acetyl-$\Delta^{1,3,5(10)}$-gonatriene.—A mixture of 0.348 g. of lithium in 100 cc. of liquid ammonia at —70° C. was stirred for 10 minutes under an inert atmosphere and then 100 cc. of tetrahydrofuran followed by 6.7 g. of 3-methoxy-13β-ethyl - 17α - acetyl-17β-acetoxy-$\Delta^{1,3,5(10)}$-gonatriene (described in published Dutch application No. 6607588) were added to the mixture. After stirring for 4 hours at —70° C., 26.8 cc. of methyl iodide were added to the reaction mixture which was then stirred for 2 hours at —70° C. The ammonia was removed by distillation and the mixture was added at 20° C. to a mixture of water and ethyl ether. After stirring, the organic phase was decanted off and the aqueous phase was extracted with ethyl ether. The combined ether phases were washed with water, dried and concentrated to dryness by distillation under reduced pressure. The residue was crystallized from methanol to obtain 4.8 g. of 3-methoxy-13β-ethyl-17α-methyl-17β-acetyl-$\Delta^{1,3,5(10)}$-gonatriene melting at 127° C. and having a specific rotation $[\alpha]_D = +42.5°$ (c.=0.5% in chloroform).

As far as is known, this compound is not described in the literature.

Step B: 3-methoxy-13β-ethyl-17α-methyl-18,19-dinor-$\Delta^{2,5(10)}$-pregnadiene-20ξ-ol.—A solution of 3.15 g. of 3-methoxy - 13β - ethyl - 17α - methyl-17β-acetyl-$\Delta^{1,3,5(10)}$-gonatriene in 38 cc. of tetrahydrofuran was added to 53 cc. of liquid ammonia at —40° C. under an inert atmosphere and then 1.6 cc. of ethanol followed by 0.34 g. of lithium were added. The reaction mixture was stirred for 15 minutes at —40° C. followed by the addition of another 1.6 cc. of ethanol and 0.34 g. of lithium and 15 minutes of stirring at —35° C. Then, 4.7 cc. of ethanol and 0.34 g. of lithium were added to the mixture which was then stirred for 30 minutes at —35° C. Then, another 4.7 cc. of ethanol were added and the ammonia was removed by distillation. The mixture was added to ice-water and was extracted with ethyl ether. The combined ether phases were washed with water and dried to obtain 3.15 g. of a mixture of 3-methoxy-13β-ethyl-17α-methyl-18,19-dinor-$\Delta^{2,5(10)}$-pregnadiene-20α-ol and 3 - methoxy - 13β-ethyl-17α-methyl-18,19-dinor-$\Delta^{2,5(10)}$-pregnadiene-20β-ol.

As far as is known, this mixture is not described in the literature.

Step C: 13β - ethyl - 17α - methyl-18,19-dinor-$\Delta^{5(10)}$-pregnene-20α and 20β-ol-3-one.—3.15 g. of the mixture from Step B followed by 3.1 cc. of water and 3.15 g. of citric acid were added under an inert atmosphere to 24.8 cc. of methanol and the mixture was stirred for 4 hours at 20° C. The reaction mixture was then added to an ice-water mixture and the precipitate formed was recovered by vacuum filtration, was washed and dried to obtain 2.95 g. of a mixture containing 13β-ethyl-17α-methyl-18,19-dinor-$\Delta^{5(10)}$-pregnene-20α-ol-3-one and 13β - ethyl - 17α-methyl-18,19-dinor-$\Delta^{5(10)}$-pregnene-20β-ol-3-one (product A). The mixture was subjected to chromatography on silica gel to obtain the said compounds.

As far as is known, the products are not described in the literature.

Step D: 13β-ethyl-17α-methyl-18,19-dinor-$\Delta^{4,9}$-pregnadiene-20α and 20β-ol-3-one.—2.9 g. of product A from Step C were dissolved under an inert atmosphere in 37 cc. of pyridine and then 2.9 g. of pyridinium perbromide were added thereto over 40 minutes at —15° C. The mixture was stirred for 45 minutes at —15° C. and then for 16 hours at 20° C. The mixture was then added to a mixture of ice, water and aqueous hydrochloric acid and the precipitate formed was recovered by vacuum filtration, was washed and dried to obtain 2.66 g. of raw product which was subjected to chromatography over silica gel and elution with an 8:2 mixture of chloroform and acetone to obtain 13β-ethyl-17α-methyl-18,19-dinor-$\Delta^{4,9}$-pregnadiene-20α-ol-3-one and 13β-ethyl-17α-methyl-18, 19-dinor-$\Delta^{4,9}$-pregnadiene-20β-ol-3-one.

As far as is known, these products are not described in the literature.

EXAMPLE II

Preparation of 17α-methyl-19-nor-$\Delta^{4,9}$-pregnadiene-20α and 20β-ol-3-one 20 g. of 17α-methyl-19-nor-$\Delta^{5(10)}$-pregnene-20ξ-ol-3-one described in French BSM No. 5064M containing both the 20α-ol and 20β-ol isomers were dissolved in 200 cc. of pyridine under an inert atmosphere and then at 2° C. 40 cc. of a methanolic bromine solution titrating 26.8 g. per 100 cc. were added thereto over fifteen minutes. The mixture was stirred for 16 hours at room temperature and was then added to a water-ice mixture. The aqueous phase was extracted with a 50–50 mixture of ethyl ether and ethylacetate and the combined organic phases were washed successively with a 2 N aqueous hydrochloric acid solution, water, aqueous sodium bicarbonate solution and then water. The solution was dried and concentrated to dryness by distillation under reduced pressure. The residue was empasted with isopropyl ether to obtain 13.7 g. of raw product which was subjected to chromatography over silica gel and elution with a 4:6 mixture of benzene-ethyl acetate to obtain 17α-methyl-19-nor-$\Delta^{4,9}$-pregnadiene-20α-ol-3-one and 17α-methyl-19-nor-$\Delta^{4,9}$-pregnadiene-20β-ol-3-one.

As far as is known, these products are not described in the literature.

PHARMACOLOGICAL STUDY

The antivulatory activity was determined by the method described by Bennet et al. (J. Reprod. Fertility 1967, vol. 13, p. 567) in which impuberic rats were treated for 15 days with varying doses of the test products administered subcutaneously in an oily suspension. On the 6th day (J5) to the 9th day (J8) of the test, the animals received simultaneously a daily intraperitoneal administration of an aqueous solution of Chicago blue selectively colored with "Yellow Bodies" in blue. On the 16th day, the animals were killed and the yellow bodies were counted. The presence of colorless yellow bodies indicates that ovulation was produced during the course of the treatment from the 9th to the 15th day. The weight of surrenals, the ovaries and uterus were determined at the same time. The results are reported in Table I. The 20α and 20β-ol compounds were administered at the daily doses of 200γ, 1 mg. and 2 mg.

TABLE I

| Product | Dose | Ovaries in mg. | Uterus in mg. | Surrenals in mg. | Number yellow bodies |
|---|---|---|---|---|---|
| Controls | 0 | 62.5 | 322.3 | 48.2 | 11.4 |
| 17α-methyl-19-nor-Δ⁴,⁹-pregnadiene-20α-ol-3-one. | 200γ | 38.4 | 227.05 | 45.6 | 0 |
|  | 1 mg | 35.9 | 239.2 | 46.3 | 0 |
| Controls | 0 | 58.9 | 314.6 | 52.7 | 10.8 |
| 17α-methyl-19-nor-Δ⁴,⁹-pregnadiene-20β-ol-3-one. | 200γ | 51.1 | 257.9 | 50.1 | 2.7 |
|  | 2 mg | 33.4 | 296.8 | 40.6 | 0 |

The results in Table I show that the two products possess an important antiovulatory activity at a dose of 200γ.

Various modifications of the products and method of the invention may be made without departing from the spirit or scope thereof and it is to be understood that the invention is to be limited only as defined in the appended claims.

We claim:
1. A 13β-R-17α-methyl-18,19-dinor-Δ$^{4,9}$-pregnadiene of the formula

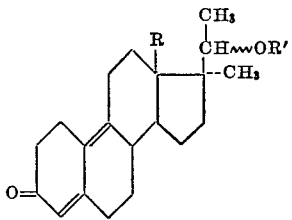

wherein R is alkyl of 1 to 4 carbon atoms and R' is selected from the group consisting of hydrogen and acyl of an organic carboxylic acid of 1 to 18 carbon atoms.

2. A compound of claim 1 which is the 17α-methyl-19-nor-Δ$^{4,9}$-pregnadiene-20α-ol-3-one.

3. A compound of claim 1 which is 17α-methyl-19-nor-Δ$^{4,9}$-pregnadiene-20β-ol-3-one.

4. A compound of claim 1 which is 13β-ethyl-17α-methyl-18,19-dinor-Δ$^{4,9}$-pregnadiene-20β-ol-3-one.

5. A compound of claim 1 which is 13β-ethyl-17α-methyl-18,19-dinor-Δ$^{4,9}$-pregnadiene-20α-ol-3-one.

6. A process for the preparation of a compound of claim 1 wherein R' is hydrogen comprising reacting 3-methoxy-13β-R-17α-acetyl - 17β - acetoxy-Δ$^{1,3,5(10)}$-gonatriene with lithium in liquid ammonia and then with a methylating agent to obtain 3-methoxy-13β-R-17α-methyl-17β-acetyl-Δ$^{1,3,5(10)}$-gonatriene, subjecting the latter to the Birch reaction by reaction with lithium in liquid ammonia in the presence of ethanol to obtain 3-methoxy-13β-R-17α-methyl-18,19-dinor - Δ$^{2,5(10)}$ - pregnadiene-20ξ-ol, subjecting the latter to the action of a weak acid in an aqueous media to form 13β-R-17α-methyl-18,19-dinor-Δ$^{5(10)}$-pregnene-20ξ-ol-3-one, reacting the latter with a bromination agent selected from the group consisting of bromine and pyridinium perbromide in the presence of a dehydrobromination agent to form the corresponding 13β-R-17α-methyl-18,19-dinor-Δ$^{4,9}$-pregnadiene-20-ol-3-one.

7. The process of claim 6 wherein the methylating agent is a methyl halide.

8. A compound of claim 1 which is the 17α-methyl-19-nor-Δ$^{4,9}$-pregnadiene-20α-ol-3-one, 20 acetate.

9. A compound of claim 1, which is the 17α-methyl-19-nor-Δ$^{4,9}$-pregnadiene-20α-ol-3-one, 20 hexanoate.

References Cited
UNITED STATES PATENTS
3,547,959  12/1970  Jolly et al. _____ 260—397.3

HENRY A. FRENCH, Primary Examiner

U.S. Cl. X.R.
260—397.5; 424—243